United States Patent [19]

Kinnison

[11] 4,014,673
[45] Mar. 29, 1977

[54] AIR PRECLEANER

[76] Inventor: Daniel E. Kinnison, 215 E. 2nd St., Kimball, Nebr. 69145

[22] Filed: Feb. 2, 1976

[21] Appl. No.: 654,697

[52] U.S. Cl. ............................. 55/396; 55/398; 55/455; 55/456; 55/457
[51] Int. Cl.² ........................................ B01D 45/12
[58] Field of Search ............ 55/385, 396, 397, 398, 55/276, 447, 448, 449, 455, 456, 457, 423, 424, 425–427

[56] References Cited

UNITED STATES PATENTS

| | | | |
|---|---|---|---|
| 2,913,111 | 11/1959 | Rogers | 55/426 |
| 3,077,716 | 2/1963 | Wilson | 55/448 |
| 3,232,032 | 2/1966 | Pierce | 55/276 |
| 3,339,533 | 9/1967 | Nordstrom | 55/457 |

*Primary Examiner*—Bernard Nozick
*Attorney, Agent, or Firm*—LeBlanc & Shur

[57] ABSTRACT

An air pre-cleaner is provided for use with an internal combustion engine. The pre-cleaner comprises a housing and vanes fixed to the top of the housing for imparting a circular motion to the air entering the housing between the vanes. This circular motion causes the heavy particles in the air to be projected away from the axis of the housing because of the centrifugal force on the particles caused by the circular motion. A tube means is positioned in the housing and a separator having a plurality of louvers is positioned in the housing between the wall of the housing and the tube. The heavy particles pass through the openings in the louvers and fall from the separator means under the influence of gravity and exit from the housing. The air with the heavy particles removed therefrom then passes through the tube and into the engine. A control mechanism is positioned in the housing between the separator and the exit for controlling the flow of air through the exit towards the separator. The control mechanism comprises a first frustro-conical plate fixed to the tube and extending towards the wall of the housing with the end of the plate being spaced from the wall of the housing, and a second frustro-conical plate fixed to the wall of the housing and extending towards the tube with a space being formed between the end of the second frustro-conical plate and a tube. The width of the first space is greater than the width of the second space whereby the velocity of air passing through the second space is reduced as it passes through the first space. Thus the heavy particles are separated from the air entering the internal combustion engine and the air drawn by the engine through the exit for the heavy particles is controlled.

5 Claims, 3 Drawing Figures

AIR PRECLEANER

BACKGROUND OF THE INVENTION

1. Field of the Invention

The present invention is directed to an air precleaner and in particular to an air pre-cleaner which removes heavy particles from the air and which controls the flow of air into the pre-cleaner through the exit for the particles.

2. Description of the Prior Art

One of the serious problems in supplying air to an internal combustion engine is the removal of heavy particles, such as dirt, from the air prior to the mixture of the air with the fuel. The conventional technique for removing these particles has been the placement of a paper or oil filter in the air intake, these filters separating the heavy particles from the air prior to its mixture with the fuel. However, one of the disadvantages of this technique is that the heavy particles accumulate on the air or oil filter and after a period of time the filter must be removed and cleaned or replaced.

In order to overcome this disadvantage, pre-cleaners have been developed which impart a circular motion to the air entering the pre-cleaner. The circular motion creates a centrifugal force on the heavy particles and forces them towards the outer walls of the pre-cleaner. A separator is provided for removing these particles as they move outward. One type of separator is a louvered plate in which the openings in the louvers face the direction of circular motion of the air. The heavy particles pass through the openings in the louver and are removed from the device. The air with the heavy particles removed is then passed through a conventional filtering system and subsequently mixed with the fuel. A device of this type can be found in Pierce, U.S. Pat. No. 3,232,032, for example.

The disadvantage of this type of device for removing the heavy particles is that the engine draws air not only through the pre-cleaner air intake but also through the heavy particle exit and then through the louvers into the engine. This tends to defeat the purpose of the pre-cleaner since the air being drawn into the engine through the particle exit will contain heavy particles and also may tend to pick up some of the heavy particles which have been removed from the air entering the air intake.

SUMMARY OF THE INVENTION

It is the primary object of the present invention to provide an air pre-cleaner for use with an internal combustion engine which includes a control mechanism for reducing the velocity of the air drawn by the engine through the heavy particle exit and louvers thereby substantially eliminating the flow of this air into the engine.

It is still another object of the present invention to provide an air pre-cleaner with a control mechanism comprising two frustro-conical plates being positioned between the pre-cleaner housing and a tube within the housing for carrying precleaned air to the engine, wherein each of the plates is fixed at one end and spaced from either the tube or housing at the other end and wherein the spacing is such as to substantially reduce the velocity of air flowing into the housing from the exit for the heavy particles.

The present invention is directed to an air pre-cleaner for use with an internal combustion engine. The pre-cleaner comprises a housing and vanes fixed to the top of the housing for imparting a circular motion to the air entering the housing such that heavy particles in the air are projected away from the axis of the housing by the centrifugal force thereon caused by the circular motion. A tube is positioned in the housing for carrying the precleaned air to the conventional engine air filtration device and a separator is positioned in the housing between the wall of the housing and the tube, the separator having a plurality of louvers therein positioned such that the heavy particles in the air pass through the louvers and fall away from the separator under the influence of gravity and then exit from the housing through an exit. A control mechanism is positioned in the housing between the separator and the exit for controlling the flow of air through the exit towards the separator. The control mechanism comprises a first frustro-conical plate fixed to the tube and extending towards the wall of the housing such that a first space is formed between the end of the plate and the wall of the housing, and a second frustro-conical plate fixed to the wall of the housing and extending towards the tube such that a second space is formed between the end of the second plate and the tube. The diameter of the first space is greater than the diameter of the second space whereby the velocity of air passing through the second space is reduced as it passes through the first space thereby substantially eliminating the flow of air through the exit towards the separator. Due to the substantial elimination of the flow of air from the exit for the heavy particles towards the separator, the flow of heavy particles through the pre-cleaner away from the separator is not disrupted and heavy particles carried by the air entering the pre-cleaner through the heavy particle exit does not reach the engine.

DESCRIPTION OF THE PREFERRED EMBODIMENTS

Figure 1:
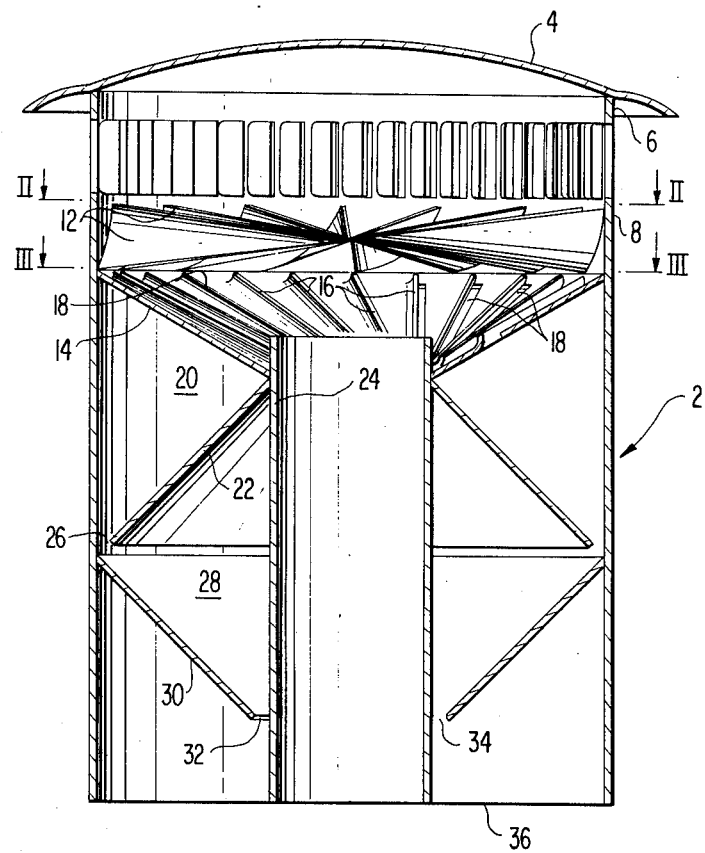
FIG. 1 is a sectional elevation of the present invention.

Referring to FIG. 1, pre-cleaner 2 is mounted on an internal combustion air intake which includes a paper or oil bath filter (not shown). The pre-cleaner 2 comprises a cap 4 and screen 6 which are held on housing 8 by means of a ring and clamp mechanism 10.

Figure 2:
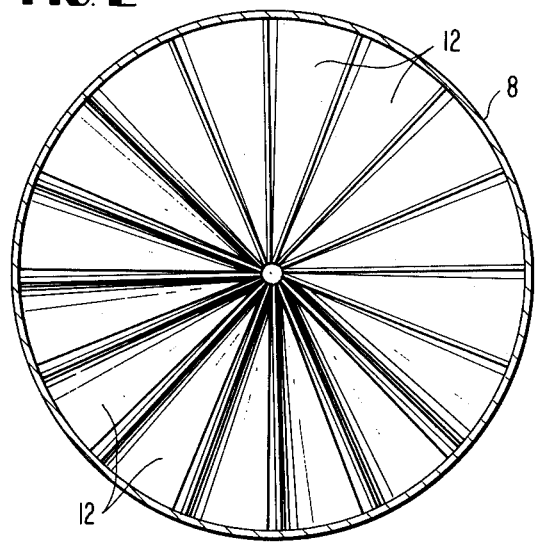
FIG. 2 is a section through line II—II in FIG. 1.

A plurality of vanes 12 are disposed in housing 8 in the manner shown in FIGS. 1 and 2 such that when air is drawn into the engine it passes between the plates. The relative positioning of the plates with respect to each other and with respect to the housing imparts a whirling spiral or circular motion to the air.

Figure 3:
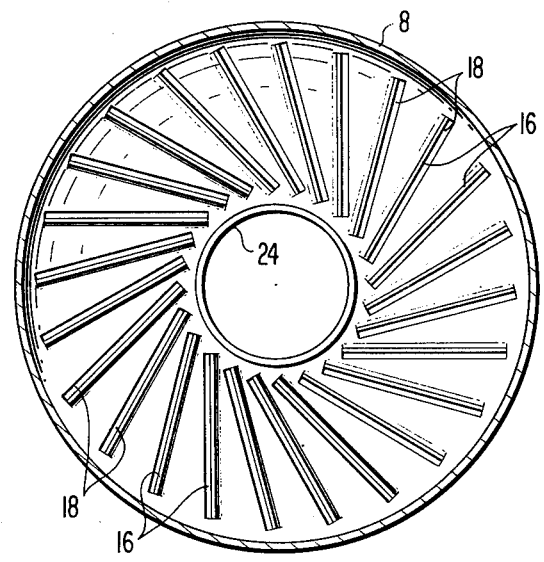
FIG. 3 is a section through line III—III in FIG. 1.

A separator is positioned beneath the vanes 12, the separator including a conical plate 14 having a plurality of louvers 16 cut therein. Each of the louvers has an opening 18 formed therein. Referring to FIG. 3, it can be seen that the louvers are canted at approximately 15° with respect to the radius of the cone.

Because of the circular motion imparted to the air as it passes between the vanes 12, the heavy particles such as dirt are thrown outwards by the centrifugal force. Thus, these heavy particles will be thrown against the plate 14 and as the heavy particles pass the louvers 16 gravity will force the particles through the openings 18 and they will fall into space 20. The particles will then strike conical plate 22 which is fixed to tube 24 which is concentric with the housing 8. The heavy particles will then pass through space 26 and into space 28 defined by conical plate 30. Conical plate 30 is fixed to the wall of housing 8 and is attached to tube 24 at three points, one of which is shown at 32. The end of plate 30 is spaced from tube 24 thereby forming a space 34. The plates 22 and 30 form a control mechanism for preventing air from flowing from the particle exit 36 up through space 34 and 26 through opening 18 in louver 16 and into the engine air intake. This is accomplished by making space 34 smaller than space 26. The velocity of air passing through space 34 is controlled by the width of space 34. Space 26 is made substantially larger than space 34 thereby substantially reducing the velocity of the air and thereby eliminating the effect, of the air entering the exit 36, on the heavy particles which are flowing down through the housing 8 towards exit 36. Also the air entering the exit 36 will contain heavy particles and this air does not reach the air intake through tube 24. Thus the problems in prior art air pre-cleaners are eliminated.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An air pre-cleaner for use with an internal combustion engine, said pre-cleaner comprising:
    a. a housing having an inlet in the upper portion thereof adapted to admit air to be cleaned, and an outlet in the lower portion thereof;
    b. vane means mounted within the upper portion of said housing below the inlet for imparting a circular motion to air entering the inlet and passing downwardly through said vane means, such that heavy particles in said air are projected from the axis of said housing by the centrifugal force thereon caused by the circular motion;
    c. tube means positioned within said housing below said vane means, said tube means defining an axial passage through the central and lower portions of said housing;
    d. separator means positioned within said housing between the wall of said housing and said tube means, and below said vane means, said separator means having a plurality of louver means therein, wherein the heavy particles in said air pass through said louver means, fall away from said separator means under the influence of gravity, and exit said housing through the outlet therein; and
    e. control means positioned in said housing between said separator means and the outlet for limiting the upward flow of air through the outlet, into said housing, and toward said separator means whereby air entering said outlet will not restrict the separation of heavy particles from the inlet air in said separator means so that air entering the inlet will pass through said vane means as a circular flow into said separator means wherein the heavy particles separated therein will fall through the outlet and the cleaned air will be directed through said tube means for use in said internal combustion engine.

2. The air pre-cleaner of claim 1 wherein said control means comprises a first frustro-conical plate fixed to said tube means and extending towards the walls of said housing, wherein a first space is formed between the end of said first frustro-conical plate and the wall of said housing, and a second frustro-conical plate fixed to the wall of said housing and extending toward said tube means, wherein a second space is formed between the end of said second frustro-conical plate and said tube and wherein the diameter of said first space is greater than the diameter of said second space whereby the velocity of air passing through said second space is reduced as it passes through said first space.

3. The air pre-cleaner of claim 2 wherein said separator means comprises a third frustro-conical plate fixed to the wall of said housing and said tube and wherein said louvers are positioned such that the open end thereof faces the direction from which said air is flowing.

4. The air pre-cleaner of claim 3 wherein said first frustro-conical plate is positioned below said third frustro-conical plate and said second frustro-conical plate is positioned below said first frustro-conical plate, whereby heavy particles passing through said louvers fall onto said first frustro-conical plate, pass through said first space, fall onto said second frustro-conical plate, and pass through said second space prior to exiting from said housing.

5. The air pre-cleaner of claim 4 wherein said louvers are canted 15° with respect to the radii of said third frustro-conical plate.

* * * * *